Patented Oct. 10, 1950

2,525,583

UNITED STATES PATENT OFFICE 2,525,583

REMOVAL OF ACIDIC SULFUR COMPOUNDS FROM HYDROCARBON OILS

Donald C. Bond, Northbrook, and Nelson B. Russell, Winnetka, Ill., assignors to The Pure Oil Company, Chicago, Ill., a corporation of Ohio No Drawing. Application May 8, 1944, Serial No. 534,704

8 Claims. (Cl. 23—184)

This invention relates to a reagent and method for regeneration of alkaline solution containing mercaptides formed by the treatment of hydrocarbon oils containing mercaptans with alkali solutions.

In applications of Dr. Donald C. Bond, Serial No. 421,250, filed December 1, 1941, now abandoned, and Serial No. 532,000, filed April 20, 1944, now Patent 2,369,771, issued February 20, 1945, there is disclosed a method for regenerating used mercaptide-containing alkali solution, in which the used solution is contacted with a gas containing free oxygen, such as air, in the presence of a tar fraction obtained by destructive distillation of wood, particularly the wood tar fraction boiling between approximately 240° and 300° C. obtained by destructive distillation of hard woods such as, hickory, beech, maple and oak. The method of preparing such tars is set forth in Patents Nos. 1,889,835 and 1,889,836. Materials prepared in accordance with these patents are sold commercially as a gasoline inhibitor under the name of U. O. P. Inhibitor #1.

We have discovered that if wood tar fractions prepared as set forth in the aforesaid patents and boiling within the range of approximately 240°–300° C., and particularly tars obtained from the destructive distillation of hard wood, such as hickory, beech, maple, oak and aspen, are washed with water or with dilute alkali solution, the soluble portion of the wood tar is much more active than the original tar as an oxidation accelerator in the air regeneration of used alkali solutions containing mercaptides resulting from the extraction of mercaptans from hydrocarbon oils.

It is well-known that mercaptans can be extracted from hydrocarbon oils, such as gasoline, by intimately contacting the oil with aqueous alkali of fairly high alkali concentration, as for example, solutions containing from approximately 10 to 40% by weight of free alkali metal hydroxide. It is also known that the ability of aqueous alkali to extract mercaptans from hydrocarbon oils is greatly enhanced if the solution contains a solubility promoter such as, alkali metal naphthenates, alkali metal salts of cresylic acids and alkali metal salts of low boiling fatty acids, such as isobutyric acid.

It has been common practice in commercial operation of processes using aqueous alkali metal hydroxide containing solubility promoters to remove mercaptans from gasoline, to regenerate such solutions by steam stripping. By blowing steam through the used solutions at temperatures of approximately 220 to 250° F., the alkyl mercaptides in the solution are hydrolyzed to mercaptans and can be readily separated as vapor from the alkali solution.

The present process is designed to effect economies in the regeneration of used alkali solution resulting from extraction of mercaptans from hydrocarbon oils by substituting for the steam stripping operation an air-blowing operation. We have found that by incorporating in the alkali solution a small amount of the soluble portion of wood tar distillate, the used alkali solution can be regenerated by air-blowing much more rapidly than is possible when using the same quantity of the unwashed tar. The wood tar distillate acts as an oxidation catalyst to accelerate the rate of oxidation of mercaptides to disulfides. By utilizing air instead of steam stripping for regeneration, the regeneration of the used solution can not only be more economically, but also more completely, effected. Air regeneration can be carried out at ordinary atmospheric temperatures. Temperatures of from 60° to 130° F. are satisfactory, although we prefer to regenerate at temperatures of approximately 100°–130° F. Lower temperatures than 60° F. may be used in the regeneration, but require longer period for regeneration. Higher temperatures than 130° effect regeneration more rapidly, but may cause undesirable oxidation of the petroleum hydrocarbons. Regeneration is effected at atmospheric pressure although subatmospheric or super-atmospheric pressure can be used.

In carrying out our invention, hydrocarbon oil, such as gasoline, containing mercaptans, may be contacted in a counter-current contact tower, preferably containing a contacting surface such as Raschig rings, with an aqueous solution containing free alkali such as sodium and/or potassium hydroxide. The solution should contain at least 5% by weight of free alkali metal hydroxide and preferably about 10% to 25% by weight. The alkali solution should preferably contain a solubility promoter to aid in extracting the mercaptans from the oil. In commercial practice it has been found that a proportion of approximately 5 to 20% by volume of aqueous alkali solution based on the oil being treated, is sufficient to lower the mercaptans in the oil to the desired point. The spent alkali solution is then charged to a regenerating tower where it may be passed downwardly over a contacting body such as Raschig rings and contacted with a stream of air passing upward through the tower. The contacting period is so adjusted that the residual mercaptide sulfur in the alkali solution is lowered to the desired level, which may be in the neighborhood of 0.1 to 0.6% by weight. The alkali solution will have incorporated therein from 0.1 to approximately 3% by weight of the water soluble or dilute aqueous alkali soluble portion of the wood tar in order to catalyze the regeneration of the alkali solution.

After the alkali solution has been contacted with air, it may be passed to a settling chamber from which the aqueous alkali solution and the oily disulfide layer are separately withdrawn. The alkali solution may, if desired, be washed with a low-boiling hydrocarbon liquid, such as naphtha, in order to remove from the aqueous alkali solution any suspended disulfides. The alkali solution may also be blown with an inert gas or vapor such as nitrogen or steam, either immediately after the air regeneration step or after the naphtha washing step in order to remove any occluded oxygen from the solution. It will be understood that either the naphtha washing or the inert gas or vapor blowing step or both, may be omitted or that either step may be used. After regeneration the alkali solution is recycled to the treating tower for further use. The process is preferably operated as a continuous cyclic process.

Our novel oxidation catalyst or accelerator retains its activity through a considerable number of regenerations and therefore, it is not necessary to add new catalyst in each regeneration cycle. When the activity of the catalyst begins to fall off, a small amount of make-up, tar fraction or aqueous solution thereof, may be added to the solution from time to time to bring the activity back to approximately the original level.

In order to demonstrate the effectiveness of the soluble portion of wood tar as catalyst in the air regeneration of used alkaline, the following examples are given.

*Example 1.*—2.2 cc. of U. O. P. Inhibitor #1 was shaken with 100 cc. of distilled water and the mixture then centrifuged. An aqueous solution was obtained containing 36% by volume or 0.8 cc. of the inhibitor in solution. 64% by volume or 1.4 cc. of the U. O. P. Inhibitor #1 remained undissolved.

25 cc. of the aqueous solution (¼ of the total volume) was mixed with 22 cc. of aqueous sodium hydroxide containing 20% by weight of sodium hydroxide so as to obtain 50 cc. of a 10% sodium hydroxide solution containing .36% by weight of the water soluble portion of U. O. P. Inhibitor #1. To this solution was added 1.86 cc. of normal butyl mercaptan in order to have 1% by weight of mercaptan sulfur present in the solution. The solution was then placed in a 100 cc. graduated cylinder containing 75 cc. of No. 4 glass beads. A dip tube was placed in the cylinder so that the bottom thereof extended to the bottom of the cylinder and the air was passed through the tube and bubbled through the solution for one hour at the rate of 0.03 cubic foot per hour at a temperature of 75° F. At the end of this period the mixture was washed with mercaptan-free naphtha and the naphtha solution was then analyzed for disulfides.

Similar oxidation tests were made in which no oxidation catalyst was used and in which the water insoluble fraction of the U. O. P. Inhibitor #1 was added as catalyst.

*Example 2.*—1 cc. of U. O. P. Inhibitor #1 was titrated with 0.1 normal aqueous potassium hydroxide solution to a pH of 11, using B. D. H Universal Indicator. The titration required 24 cc. of the KOH solution.

2.1 cc. of U. O. P. Inhibitor #1 were then mixed with 50.4 cc. of 0.1 normal aqueous potassium hydroxide solution (the amount of solution required to bring the pH to 11). 49.6 cc. of water were then added to bring the total solution to approximately 100 cc. and the solution then centrifuged. The aqueous solution resulting contained 55% by volume or 1.16 cc. of the U. O. P. Inhibitor #1. 25 cc. of the aqueous solution (¼ of the total solution) was mixed with 25 cc. of aqueous sodium hydroxide solution containing 20% by weight of sodium hydroxide, in order to obtain a 10% aqueous sodium hydroxide. To the 50 cc. of solution was added 1.86 cc. of normal butyl mercaptan in order to have 1% by weight of mercaptide sulfur present and the oxidation test as set forth in the previous example was run. Oxidation tests were also run on aqueous sodium hydroxide solution of the same concentration containing the insoluble portion of the U. O. P. Inhibitor #1.

The results of the various oxidation tests run are set forth in the following table:

*Table*

| No. | Solution Tested | | | | Per Cent Oxidation of Total n-butyl Mercaptan Present |
|---|---|---|---|---|---|
| | Catalyst | Per Cent Catalyst, by Wt. | Per Cent NaOH | Per Cent n-butyl Mercaptan | |
| 1 | None | 0.0 | 10 | 1.0 | 0.9 |
| 2 | U. O. P. Inhibitor #1 | 0.1 | 10 | 1.0 | 3.4 |
| 3 | ——do—— | 0.36 | 10 | 1.0 | 5.3 |
| 4 | ——do—— | 0.55 | 10 | 1.0 | 9.4 |
| 5 | ——do—— | 1.0 | 10 | 1.0 | 19.8 |
| 6 | Water-soluble Fraction of U. O. P. Inhibitor #1 | 0.36 | 10 | 1.0 | 14.0 |
| 7 | Water-insoluble Fraction of U. O. P. Inhibitor #1 | 0.64 | 10 | 1.0 | 9.4 |
| 8 | Fraction of U. O. P. Inhibitor #1 Soluble at pH 11 | 0.55 | 10 | 1.0 | 19.0 |
| 9 | Fraction of U. O. P. Inhibitor #1 Insoluble at pH 11 | 0.45 | 10 | 1.0 | 4.8 |

It will be seen from the results that on a weight for weight basis the water soluble fraction of U. O. P. Inhibitor #1 is approximately 2.5 times as active as the original inhibitor and that the portion soluble in alkali solution of pH 11 is almost twice as active as the original inhibitor. It will also be seen that the water-insoluble fraction and the fraction insoluble in alkali solution of pH 11 are less active than the original inhibitor.

In preparing the catalyst from the tar fraction, the tar may be intimately mixed with neutral water or with a weakly acid or weakly basic aqueous solution having a pH from about 1 to 11 in order to extract the soluble portion from the tar. The amount of neutral, weakly acid or weakly basic water used may vary over wide limits, as for example, a ratio of as high as 500 parts of water to 1 part of tar. We prefer, however, to limit the quantity of water to such amount that a resulting solution can be obtained which will contain the soluble tar portion in sufficient concentration for use in the process without the necessity of having to concentrate the solution. A ratio of approximately 25 to 75 parts of water to 1 part of tar will give an effective concentration of the soluble portion of the tar.

When using alkali solution to wash the tar acid in order to obtain the solubility promoter, we prefer to use a solution of such concentration that after the soluble portion of the tar acid is dissolved therein, the resulting solution will not have a pH in excess of approximately 11. The higher the pH of the aqueous solution that is used in extracting tar, the greater the proportion of the tar that is soluble, but the catalytic effect of the extract obtained with alkali solution on a weight for weight basis is less than the extract obtained by neutral water washing. Extraction with dilute alkali solution, however, has the advantage over water extraction in that the total extract from a given amount of tar extracted with the alkali solution gives more rapid acceleration than the total extract that can be obtained from the same amount of tar by extraction with neutral water.

It will be seen, therefore, that by extracting wood tar boiling within the approximate range of 240° to 300° C., and particularly hard wood tar boiling within this range, with water or with weakly acid or weakly alkali aqueous solution, an extract can be obtained which when added to alkali solutions, which may or may not contain solubility promoters, in such amount that the concentration of the soluble tar in the resulting alkali solution is approximately 0.1 to 3% by weight, regeneration of the used alkali by means of air-blowing or other free oxygen-containing gas can be effected far more rapidly than is possible by utilizing the same weight of the entire tar fraction.

It is claimed:

1. The method of removing mercaptide sulfur from aqueous alkali solution containing alkali metal mercaptides comprising contacting said solution with a gas containing free oxygen, in the presence of an amount, sufficient to accelerate oxidation of mercaptides, of substantially all constituents of wood tar boiling between approximately 240° and 300° C., extracted therefrom by means of aqueous solvent, having a pH of not less than approximately 1 and not in excess of 11, in a volume ratio of approximately 25 to 75 parts of solution per part of tar, said contacting being carried out in the substantial absence of those constituents of the wood tar insoluble in said aqueous solution, and separating the resulting disulfides from the alkali solution.

2. The method in accordance with claim 1 in which the tar is a hard wood tar.

3. The method in accordance with claim 1 in which the tar is beechwood tar.

4. The method in accordance with claim 1 in which the tar is maple wood tar.

5. The method in accordance with claim 1 in which the tar is aspen wood tar.

6. Method in accordance with claim 1 in which said alkali solution is contacted with said gas at temperatures between approximately 60° and 130° F.

7. Method in accordance with claim 1 in which the solvent used to extract the tar is substantially neutral water.

8. The method of oxidizing mercaptan sulfur compounds occurring in hydrocarbon oil to disulfides which comprises contacting said compounds with free oxygen-containing gas in the presence of aqueous alkali solution containing a small but sufficient amount to promote said oxidation, of substantially all constituents of hardwood tar boiling between approximately 240° and 300° C., extracted therefrom by means of aqueous solution, having a pH of not less than approximately 1 and not in excess of 11, in a volume ratio of approximately 25 to 75 parts of solution per part of tar, said contacting being carried out in the substantial absence of those constituents of wood tar insoluble in said aqueous solution.

DONALD C. BOND.
NELSON B. RUSSELL.

REFERENCES CITED

The following references are of record in the file of this patent:

UNITED STATES PATENTS

| Number | Name | Date |
|---|---|---|
| 1,889,835 | Lowry et al. | Dec. 6, 1932 |
| 1,889,836 | Lowry et al. | Dec. 6, 1932 |
| 2,334,564 | Lewis | Nov. 16, 1943 |
| 2,369,771 | Bond | Feb. 20, 1945 |

OTHER REFERENCES

Rogers Manual of Industrial Chemistry, Furnas, Editor; 6th edition, vol I., D. Van Nostrand Co. Inc., New York, N. Y. (1942), page 679.

The Technology of Wood Distillation, by Klar, translated by Rule, Chapman and Hall Ltd., London (1925); pages 349 to 353.